UNITED STATES PATENT OFFICE.

WILLIAM B. FINK, OF NEW YORK, N. Y.

COMPOSITION OF MATTER FOR BLEACHING AND CLEANING.

1,151,257.           Specification of Letters Patent.      Patented Aug. 24, 1915.

No Drawing.       Application filed August 17, 1912.    Serial No. 715,605.

*To all whom it may concern:*

Be it known that I, WILLIAM B. FINK, a citizen of the United States, and a resident of New York, county and State of New York, have invented a certain new and useful Improvement in Compositions of Matter for Bleaching and Cleaning, of which the following is a full, clear, and exact specification.

My composition has for its object to provide a bleacher and cleanser designed to be employed in laundries, woolen mills, silk mills, and other similar places, for cleaning wearing apparel and other articles which are made of linen, cotton goods, or other washable fabrics, and which serves to effectually bleach and cleanse the articles without damaging the goods, or fading the most delicate colorings thereof as well as saving the consumption of thirty to fifty per cent. of the soap ordinarily used, and also permitting the employment of injurious chlorids and acid bleaches to be dispensed with.

My composition of matter consists of the following ingredients, combined in the proportions stated, viz:—calcium oxid (unslaked lime) 7 pounds, potassium carbonate 25 pounds, potassium permanganate 1 pound, ammonium chlorid (sal-ammoniac) 2 pounds, sodium biborate (borax) 12 pounds, water, sufficient quantity to make 48 gallons.

The ingredients are placed in a barrel, or other suitable receptacle, and then dissolved in four gallons of boiling water by agitation in any preferred manner. The remainder of the water is then added to the mixture which is allowed to stand until all solid surplus substances have been deposited upon the bottom of the receptacle. In practice only the clear liquid is used. For washing laundry a proportion of one-third of the liquid and two-thirds of neutral soap are boiled together and this mixture is used in the manner incident to the methods ordinarily employed in laundries.

While in the foregoing I have embodied the preferred formula of my composition of matter, I do not wish to be understood as limiting myself to the exact proportion of the ingredients as mentioned, as I am aware that changes may be made therein, therefore I reserve to myself the right to vary the proportions of the ingredients as well as eliminate one or more of said ingredients, in order to meet the requirements for the use of the composition as occasion demands.

Having thus described my invention, I claim as new and desire to secure by Letters Patent:—

1. The herein described composition of matter formed by mixing calcium oxid, potassium carbonate, potassium permanganate, sodium biborate, ammonium chlorid, and water, substantially as described and for the purpose specified.

2. The herein described composition of matter formed by mixing calcium oxid seven pounds, potassium carbonate, twenty-five pounds, potassium permanganate one pound, ammonium chlorid two pounds, sodium biborate twelve pounds, and water sufficient quantity to make forty-eight gallons, substantially as described and for the purpose specified.

This specification signed and witnessed this sixteenth day of August A. D. 1912.

WILLIAM B. FINK.

Witnesses:
ROBT. B. ABBOTT,
M. DERMODY.